United States Patent [19]
Hac et al.

[11] Patent Number: 6,161,905
[45] Date of Patent: Dec. 19, 2000

[54] ACTIVE BRAKE CONTROL INCLUDING ESTIMATION OF YAW RATE AND SLIP ANGLE

[75] Inventors: Aleksander Boguslaw Hac, Dayton; Melinda Daniele Simpson, Jamestown, both of Ohio

[73] Assignees: General Motors Corporation, Detroit; Delphi Technologies, Inc., Troy, both of Mich.

[21] Appl. No.: 09/195,674

[22] Filed: Nov. 19, 1998

[51] Int. Cl.[7] .................................................. B60T 8/60
[52] U.S. Cl. ............................ 303/146; 303/139
[58] Field of Search .................... 303/139, 140, 303/146, 147, 150

[56] References Cited

U.S. PATENT DOCUMENTS

| | | | |
|---|---|---|---|
| 4,834,205 | 5/1989 | Mizuno et al. | 180/141 |
| 5,063,514 | 11/1991 | Headley et al. | 364/426.02 |
| 5,172,961 | 12/1992 | Inoue et al. | 303/100 |
| 5,229,944 | 7/1993 | Yasuno | 364/426.01 |
| 5,275,475 | 1/1994 | Hartmann et al. | 303/103 |
| 5,311,431 | 5/1994 | Cao et al. | 364/424.05 |
| 5,341,297 | 8/1994 | Zomotor et al. | 364/426.03 |
| 5,366,281 | 11/1994 | Littlejohn | 303/3 |
| 5,402,342 | 3/1995 | Ehret et al. | 364/424.05 |
| 5,444,621 | 8/1995 | Matsunaga et al. | 364/424.05 |
| 5,480,219 | 1/1996 | Kost et al. | 303/146 |
| 5,720,533 | 2/1998 | Pastor et al. | 303/147 |
| 5,742,918 | 4/1998 | Ashrafi et al. | 701/70 |
| 5,742,919 | 4/1998 | Ashrafi et al. | 701/70 |
| 5,746,486 | 5/1998 | Paul et al. | 303/146 |
| 5,749,062 | 5/1998 | Yamamoto et al. | 701/72 |
| 5,809,434 | 9/1998 | Ashrafi et al. | 701/1 |
| 5,878,357 | 3/1999 | Sivashankar et al. | 701/1 |
| 5,931,887 | 8/1999 | Hac | 701/71 |
| 6,035,251 | 3/2000 | Hac et al. | 701/70 |

FOREIGN PATENT DOCUMENTS

| | | |
|---|---|---|
| 0 555 860 A1 | 8/1993 | European Pat. Off. . |
| 41 23 235 C1 | 11/1992 | Germany . |
| 41 21 954 A1 | 1/1993 | Germany . |
| 42 00 061 A1 | 7/1993 | Germany . |
| 42 23 385 A1 | 1/1994 | Germany . |
| 42 29 504 A1 | 3/1994 | Germany . |
| 43 11 077 A1 | 10/1994 | Germany . |
| 43 14 827 A1 | 11/1994 | Germany . |
| 40 52 62213 | 10/1993 | Japan ............... B60T 8/32 |
| 40 60 24304 | 2/1994 | Japan ............... B60T 8/24 |
| 40 60 87421 | 3/1994 | Japan ............... B60T 8/32 |
| 40 61 15418 | 4/1994 | Japan ............... B60T 8/24 |
| 40 61 27354 | 5/1994 | Japan ............... B60T 8/24 |
| 2 275 551 | 1/1993 | United Kingdom . |
| 2 263 340 | 7/1993 | United Kingdom . |
| 2 269 571 | 2/1994 | United Kingdom . |
| 2 275 312 | 8/1994 | United Kingdom . |

OTHER PUBLICATIONS

May the Cornering Force be with You: Popular Mechanics: Dec. 1995, pp. 74–77.

Stable as She goes; Don Sherman, Automotive Industries, May 1995.

The Spin Doctors: Don Sherman, 12PS95.

(List continued on next page.)

*Primary Examiner*—Douglas C. Butler
*Assistant Examiner*—Xuan Lan Nguyen
*Attorney, Agent, or Firm*—Christopher DeVries

[57] ABSTRACT

An improved vehicle active brake control based on an estimate of vehicle yaw rate and slip angle, wherein the estimate is based on a weighted average of two yaw rate values developed with two different estimation techniques. In general, the first estimate of yaw rate is based on the relative velocity of the un-driven wheels, and the second estimate is based on a measure of lateral acceleration. Confidence levels in each estimate are determined and used to form a third or preliminary yaw rate estimate based on a weighted average of the first and second estimates, and the third estimate is supplied to a closed-loop nonlinear dynamic observer which develops the final estimate of yaw rate, along with estimates of lateral velocity and side-slip angle.

16 Claims, 8 Drawing Sheets

OTHER PUBLICATIONS

Mercedes/Bosch/ESP; Automotive Industries, Apr. 1995.
Controlling Vehicle Stability; Christopher A. Sawyer, Automotive Industries, Jan. 1995.
Let Magic Fingers Do the Driving: Wards Auto World: May 1995.
Technoid: Intelligent Brakes are on the Way; Car and Driver, Aug. 1994.
Handling Control Systems for your Car: Popular Electronics; Feb. 1995.
VDC, the Vehicle Dynamics Control System of Bosch: A. VanZanten, R. Erhardt and G. Pfaff; Robert Bosch GmbH; No. 950759, pp. 9–26.
Active Stability Control: Junichi Kubokawa, AISIN Seiki Co., Ltd., Electronics & Brake Division; Abstract; Sep. 1995.
Consideration of Lateral and Longitudinal Vehicle Stability by Function Enhanced Brake and Stabilty Control System: Heinz Leffler; SAE #940832; Feb. 28—Mar. 3, 1994.
Control of Vehicle Dynamics: Automotive Engineering; pp. 87–93; May 1995.
Improvement of Vehicle Maneuverability by Direct YAW Moment Control; Y. Shibahata, K. Shimada and T. Tomari; Society of Automotive Engineers of Japan, Inc.; pp. 464–481.
Spin Control for Cars; Steven Ashley; Mechanical Engineering; pp. 66–68; Jun. 1995.

ACTIVE BRAKE CONTROL INCLUDING ESTIMATION OF YAW RATE AND SLIP ANGLE

FIELD OF THE INVENTION

This invention relates to a vehicle active brake control in which differential braking is used to impart a yaw moment, and more particularly to a control based on an estimate of the vehicle yaw rate and side slip angle.

BACKGROUND OF THE INVENTION

Recently, vehicles have been produced with brake systems that can in certain situations actively apply brakes to individual wheels in an effort to improve vehicle stability or handling near and at the limit of adhesion. These systems usually seek to bring the vehicle as closely as possible to a desired path and/or to minimize the lateral movement of the tires relative to the road surface. Typically, the control is configured to bring the vehicle yaw and/or lateral velocity (or side slip angle) into correspondence with desired yaw and/or lateral velocity values.

Because the price of yaw rate sensors is still relatively high, active controls of the type described above are necessarily limited to a small number of vehicles. While the vehicle yaw rate can be estimated, either based on measured speeds of the un-driven wheels or measured lateral acceleration, the estimates often fail to faithfully track the actual vehicle yaw, particularly during braking or when the vehicle deviates from a steady state condition. What is desired is an active brake control that does not require a yaw rate sensor, but that can reliably estimate and control yaw rate and side slip angle even during conditions that degrade the validity of an estimated or computed yaw rate value.

SUMMARY OF THE PRESENT INVENTION

The present invention is directed to an improved vehicle active brake control based on an estimate of vehicle yaw rate, wherein the estimate is based on a weighted average of two yaw values developed with two different estimation techniques. In general, the first estimate of yaw rate is based on the relative velocity of the un-driven wheels, and the second estimate is based on a measure of lateral acceleration. Confidence levels in each estimate are determined and used to form a third yaw estimate based on a weighted average of the first and second estimates, and the third estimate is supplied to a closed-loop nonlinear observer which develops the final estimate of yaw rate, along with estimates of lateral velocity and side-slip angle.

BRIEF DESCRIPTION OF THE DRAWINGS

The present invention will now be described by way of example with reference to the following drawings, in which.

DETAILED DESCRIPTION OF INVENTION

Figure 1:
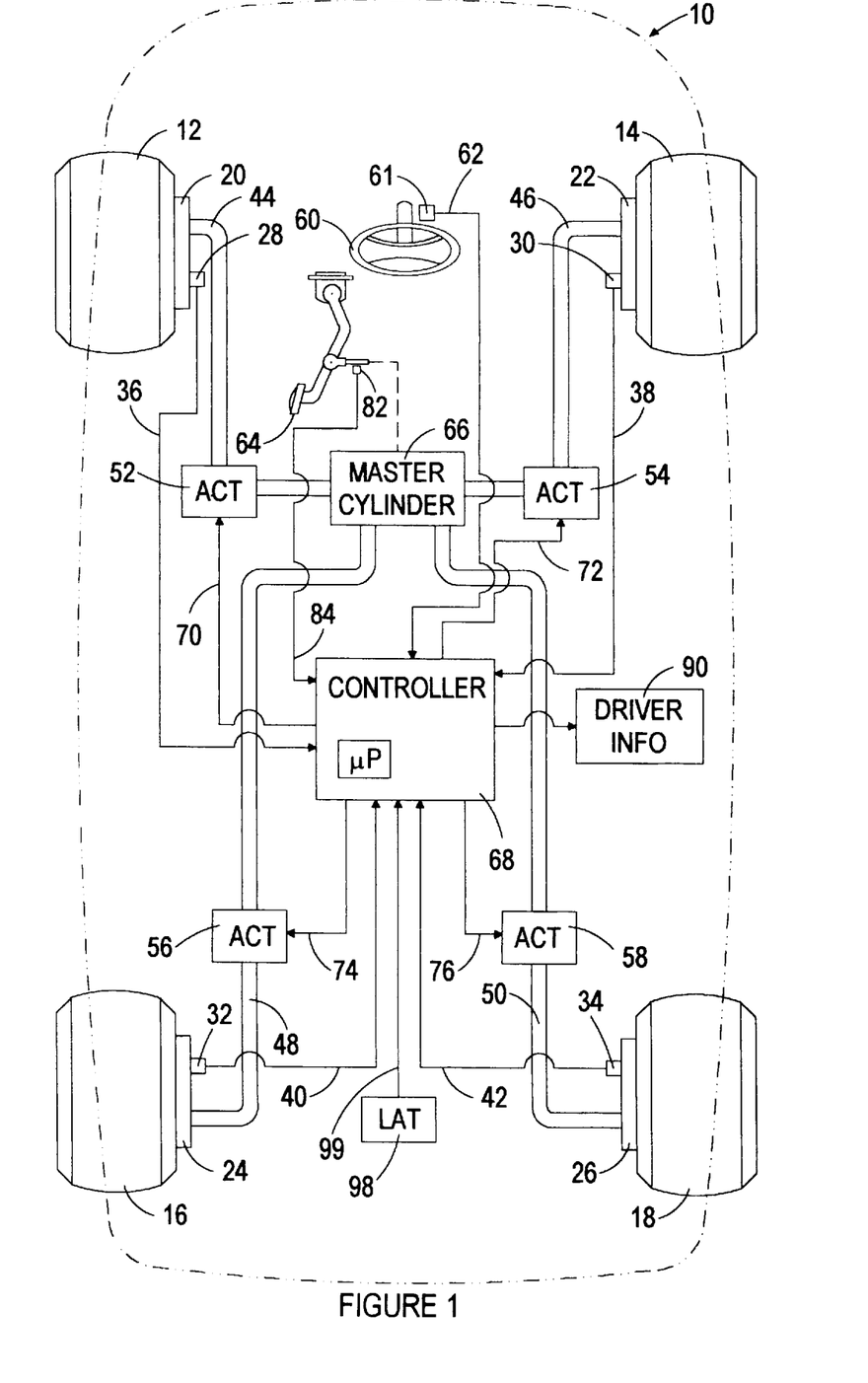
FIG. 1 is a diagram of vehicle having an active brake control implemented by an electronic controller in accordance with this invention.

FIG. 1 depicts a mechanization of a brake control according to this invention on a vehicle 10. The vehicle 10 includes a brake system having a micro-processor based controller 68 for controlling the brakes 20, 22, 24, 26 of the respective wheels 12, 14, 16, 18. The controller 68 receives various inputs, including wheel speed signals on lines 36, 38, 40, 42 from respective wheel speed sensors 28, 30, 32, 34; a brake pedal travel signal on line 84 from pedal travel sensor 82 (optional); a steering wheel angle signal on line 62 from angle sensor 61; and a lateral acceleration signal on line 99 from the lateral accelerometer 98. The sensors 28, 30, 32, 34, 61, 98 may be implemented with conventional devices in a manner known to those skilled in the art.

Under certain conditions such as wheel lock-up or spinning, the controller 68 modifies the normal braking of one or more of the wheels 12, 14, 16, 18 via the respective actuators 52, 54, 56, 58 in order to restore a desired overall operation of the vehicle. Under conditions of lateral instability, the controller 68 commands one or more of the respective actuator(s) 52, 54 to selectively increase or decrease the brake forces generated at the left and/or right front wheels 12, 14 to bring the vehicle yaw rate and slip angle into conformance with the desired yaw rate and slip angle. Exemplary actuators are shown and described in detail in the U.S. Pat. No. 5,366,291, assigned to the assignee of the present invention.

Figure 2:
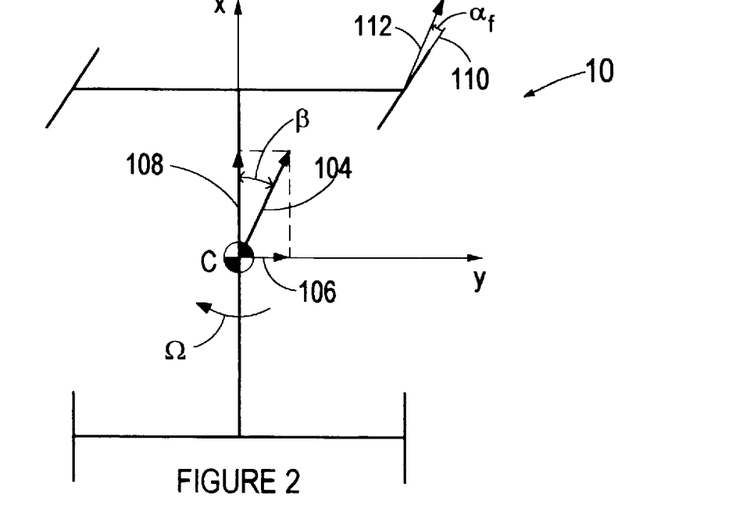
FIG. 2 is a vector diagram of important kinematic variables of the vehicle.

FIG. 2 is a schematic diagram of vehicle 10 in top view, illustrating the concepts of yaw rate, lateral velocity and slip angle. A reference frame Cxy is shown, which is attached to the moving vehicle. The x-axis is the longitudinal axis of vehicle and y-axis is perpendicular to the x-axis and lies in the plane of the figure. The vector denoted by reference numeral 104 represents an example true velocity vector of the vehicle center of gravity C. The velocity vector 104 has two components: the longitudinal velocity component 108 and lateral velocity component 106. The vehicle slip angle $\beta$ is the angle at vehicle center of gravity C between the x-axis and the velocity vector 104. Similarly, tire slip angles are defined as angles between the longitudinal axes of tires and the velocity vectors of centers of gravity of respective wheels. For example, the slip angle of the front right tire $\alpha_f$ is the angle formed by the lines 110 and 112, the line 112 representing the velocity vector of the center of the wheel. The vehicle yaw rate $\Omega$ is the velocity of rotation of vehicle 10 about the axis perpendicular to the plane of FIG. 2; rotation in the clockwise direction is assumed positive.

During vehicle operation, one can distinguish two kinds of vehicle handling behavior. The first kind of behavior (linear) occurs during driving well within the limit of adhesion where tire cornering characteristics remain within the linear range of operation. That is, cornering forces developed between the tires and the road surface remain proportional to the tire slip angles; consequently, at a given speed, the yaw rate remains approximately proportional to the steering angle, with only small delay, barely perceptible by the driver. The second kind of behavior (non-linear) occurs when the vehicle approaches the physical limit of adhesion, and the tire forces no longer increase proportionally to the slip angles, and may saturate. At this point the tire slip angles, and consequently also the vehicle slip angle, may increase quite rapidly without corresponding increase in lateral forces. In this nonlinear range of operation vehicle motion is characterized by significant lateral movement of at least some of the vehicle tires with respect to the road surface. The vehicle becomes less responsive to the driver steering inputs, and vehicle behavior is less predictable.

Since the experience of most drivers is limited to driving well within the linear range of vehicle handling behavior, stability enhancement systems usually seek to reduce the difference between the normal vehicle behavior and that at the limit, in order to improve chances of a typical driver to maintain control of vehicle in emergency situations. This can be accomplished by reducing the deviation of the vehicle yaw rate and slip angle from the desired yaw rate and slip angle during nonlinear operating conditions by active brake control. An example of such a control is set forth in the U.S. patent application Ser. No. 08/967,091, filed on Nov. 10, 1997, assigned to the assignee of the present invention, and incorporated herein by reference.

Advantageously, the control of the present invention obviates the need for a yaw sensor by estimating the vehicle yaw rate, lateral velocity, and slip angle using measurements of: steering angle, wheel speeds and lateral acceleration, an estimate of the lateral surface coefficient of adhesion, and desired values of lateral acceleration and yaw rate. In the illustrated embodiment, it is assumed that the vehicle 10 has front wheel drive and that differential braking is only applied to the front wheels 12, 14, as indicated above in reference to FIG. 1.

Figure 3:
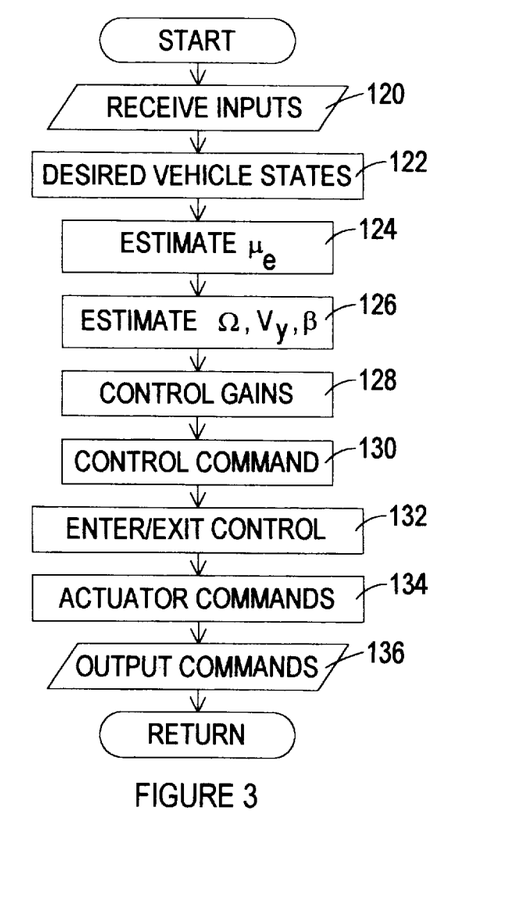
FIG. 3 is a main flow diagram executed by the controller of FIG. 1 according to this invention.

A main flow diagram for an active brake control according to this invention is set forth in FIG. 3. At block 120, inputs from the various sensors depicted in FIG. 1 are read and processed to form variables useful in connection with the estimation of yaw rate. For example, the input signals are filtered, wheel speeds are used to determine vehicle speed $V_x$, and a roll factor $r_{fac}$ specific to vehicle 10 is applied to the measured lateral acceleration $a_{ym}$ to minimize the effect of vehicle roll. Block 122 is then executed to determine the desired vehicle states, such as the desired lateral acceleration $a_{yd}$, the desired yaw rate $\Omega_d$, the desired lateral velocity $V_{yd}$ and/or side slip angle $\beta_d$. This can be achieved using a vehicle reference model such as described in the aforementioned U.S. Ser. No. 08/967,091. The block 124 is then executed to estimate the lateral surface coefficient of adhesion $\mu$, and block 126 is executed to estimate the vehicle yaw rate $\Omega$, side slip velocity $V_y$ and the slip angle $\beta$. Blocks 128 and 130 are then executed to determine the control gains and the corrective moment command $\Delta M$, or a corrective speed difference $\Delta V$ between the left and right wheels 12, 14. The exit and enter conditions are established at block 132, and the actuator commands are determined and applied to the actuators at blocks 134 and 136.

A relative measure $\mu_{ay}$ of the lateral surface coefficient of adhesion $\mu$ is based on the ratio of the measured lateral acceleration $a_{ym}$ and the maximum sustainable lateral acceleration on a dry surface $a_{ymax}$ as follows:

$$\mu_{ay}=|a_{ym}|/a_{ymax}$$

if the estimated yaw rate from block 126 and the measured lateral acceleration indicate that the vehicle has deviated significantly from a linear reference model. If these values indicate that the vehicle is operating in substantial agreement with the linear reference model, the term $\mu_{ay}$ is reset to unity. The estimated lateral surface coefficient $\mu$ is then computed as:

$$\mu=(0.85+0.15\ \mu_{ay})*\mu_{ay}$$

where the parameters 0.85 and 0.15 are calibrated for a given type of vehicle. Finally, the computed value of $\mu$ is limited to a minimum value of approximately 0.07, and to a maximum value of 1.0. Details of this estimation are set forth in the aforementioned U.S. Ser. No. 08/967,091.

Figure 4:
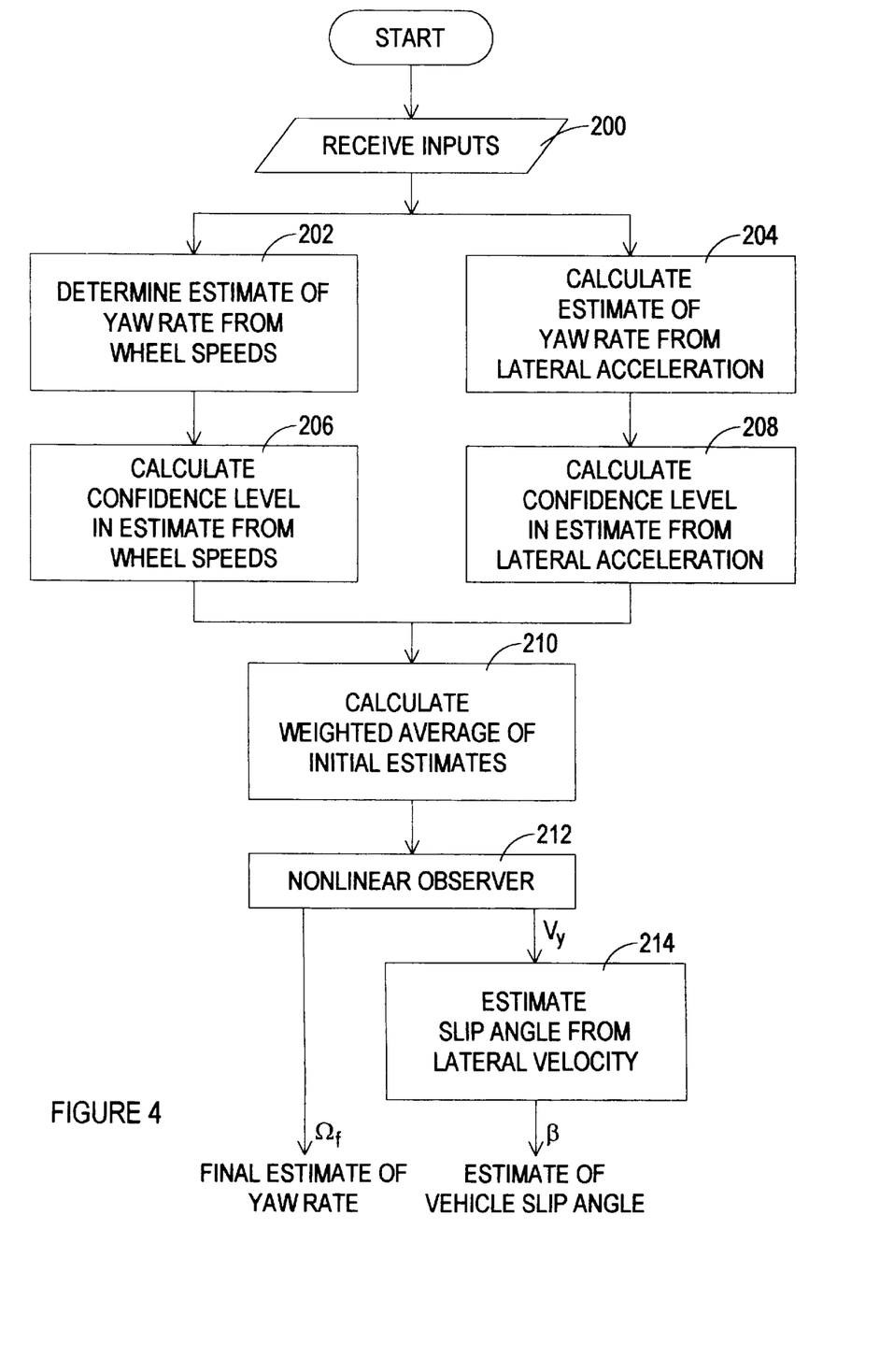
FIG. 4 is flow diagram for estimating yaw rate, lateral velocity and slip angle according to this invention.

FIG. 4 is a more detailed flow diagram of main flow diagram block 126, estimation of vehicle yaw rate $\Omega$, side slip velocity $V_y$ and the slip angle $\beta$. First, blocks 202 and 206 are executed to determine a first estimate of yaw rate based on the speeds of un-driven wheels 16, 18, and to determine a confidence level in the first estimate. These functions involve the desired and measured lateral accelerations $a_{yd}$, $a_{ym}$ and the estimated lateral coefficient of adhesion $\mu$, as described below. Then, blocks 204 and 208 are executed to determine a second estimate of yaw rate based on the measured lateral acceleration $a_{ym}$, and to determine a confidence level in the second estimate. A third estimate of yaw rate is determined at block 210 as a weighted average of the first and second estimates, with the weights proportional to the corresponding confidence levels. The third estimate, along with measured lateral acceleration $a_{ym}$, steering angle $\delta$, vehicle speed $V_x$ and the estimated surface coefficient of adhesion $\mu$, are supplied as inputs to a closed-loop nonlinear observer at block 212, which calculates a final estimate of yaw rate and an estimate of lateral velocity $V_y$. As explained below, the observer is a simple model of vehicle dynamics in the yaw plane that uses feedback of measured variables. At block 214, the slip angle $\beta$ is determined as Arctan $(V_y/V_x)$.

Figure 5:
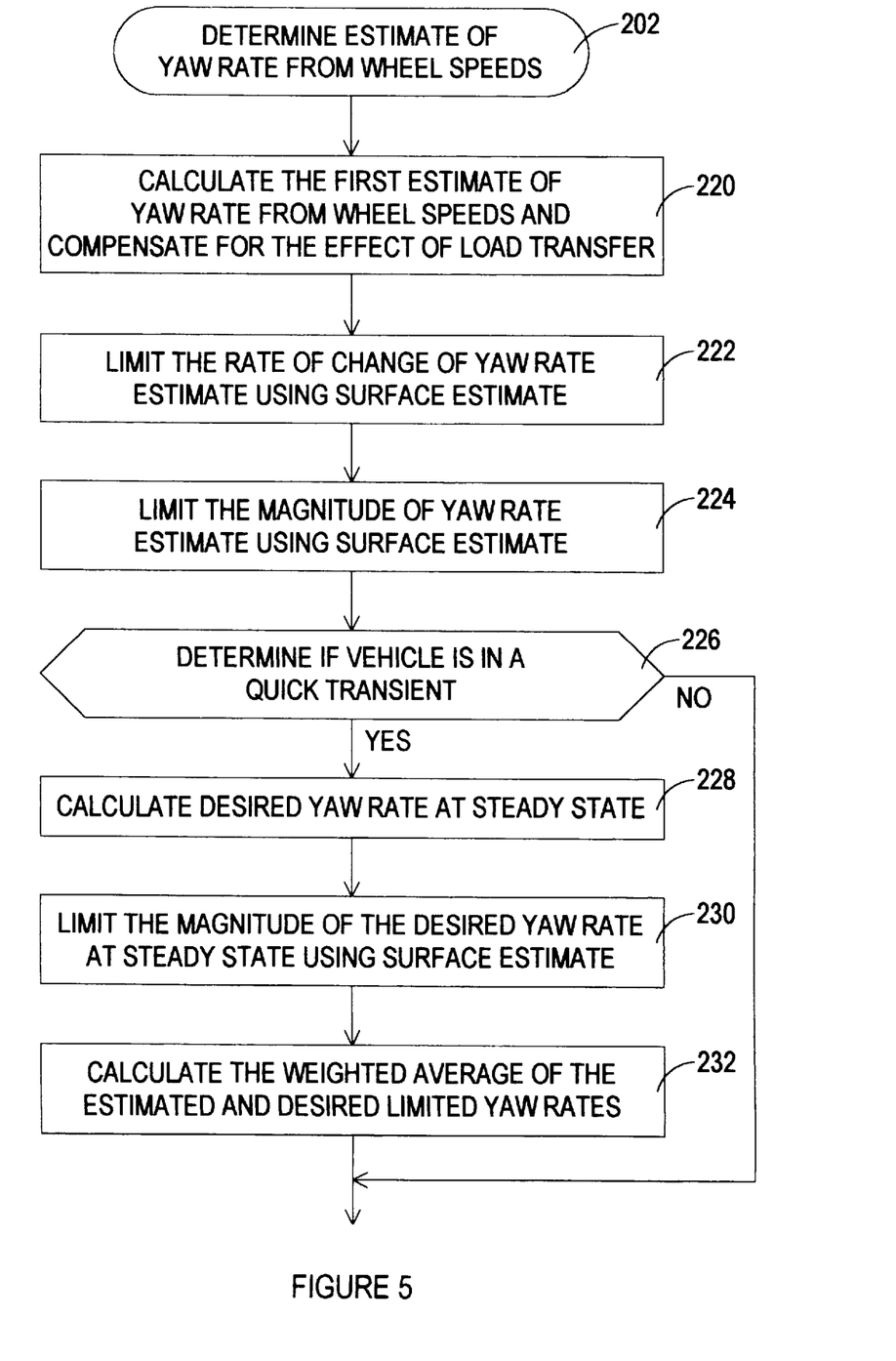
FIG. 5 is a flow diagram for estimating yaw rate from wheel speeds.

The determination of the first estimate of yaw rate—that is, from the speeds of the un-driven wheels 16, 18—is illustrated in the flow diagram of FIG. 5. For convenience, this estimate is designed as $\Omega_{ws}$. Initially, block 220 is executed to determine an initial value $\Omega_{ws1}$ according to the difference between the linear speeds of left and right rear wheels $(ws_{lr}-ws_{rr})$ divided by track width (trw) with a corrective term $(c_{lt}*V_x*a_{yf})$ compensating for tire deformation (in radial direction) due to load transfer in cornering. That is:

$$\Omega_{ws1}=(ws_{lr}-ws_{rr})/trw-c_{lt}*V_x*a_{yf} \qquad (1)$$

where $a_{yf}$ is the filtered measured lateral acceleration, and $ws_{lr}$ and $ws_{rr}$ have been normalized to account for the variation in tire radii such as due to differences in tire pressures. The corrective term $(c_{lt}*V_x*a_{yf})$ compensates for the fact that because of differences in tire normal loads during cornering maneuvers, outside tires are compressed and inside tires are extended; therefore outside wheels rotate faster (and inside wheels rotate slower) than they would have if the tires had been rigid. This phenomenon results in overestimation of yaw rate if the correction is not included. The corrective factor, $c_{lt}$, is best determined from experimental data. A preliminary value may be obtained from $$c_{lt}=(M*h)/(k_t*R_t*trw*trw) \qquad (2)$$

where M is the total mass of the vehicle, h is the height of the vehicle center of gravity above ground, $k_t$ is the tire stiffness in radial direction and $R_t$ is the rolling radius of tire. A typical value of that constant is $c_{lt}=0.00105$ rad*s²/m².

In order to reduce the effect of noise and errors in the wheel speed data the initial estimate $\Omega_{ws1}$ is then corrected at block 222 by limiting the rate of change of yaw rate, or the yaw acceleration. Since maximum yaw acceleration is directly related to the maximum lateral tire forces, which depend on the surface coefficient of adhesion, the upper limit of yaw acceleration depends on the estimate of surface coefficient of adhesion. In the illustrated embodiment, the limitation is implemented by determining the maximum change in yaw rate per loop time as:

$$\Delta\Omega_{max} = c_1 + c_2 * \mu \qquad (3)$$

where $c_1$ and $c_2$ are tunable constants, for example equal to $2*\Delta t$ and $2*\Delta t$, where $\Delta t$ is the loop time. Then, the yaw rate is limited to form $\Omega_{ws2}$ as follows:

$$\Omega_{ws2}(k) = \begin{cases} \Omega_{ws1}(k) & \text{if } |\Delta\Omega_{ws1}| \le \Delta\Omega_{max} \\ \Omega_{ws1}(k-1) + \Delta\Omega_{max} * \text{sign}(\Delta\Omega_{ws1}) & \text{if } |\Delta\Omega_{ws1}| > \Delta\Omega_{max} \end{cases} \qquad (4)$$

where $\Delta\Omega_{ws1} = \Omega_{ws1}(k) - \Omega_{ws1}(k-1)$.

Next, block 224 limits the magnitude of $\Omega_{ws2}$ to a maximum value $\Omega_{max}$ based on the estimated surface coefficient $\mu$ and vehicle speed $V_x$ to form $\Omega_{ws3}$. The maximum yaw rate $\Omega_{max}$ that vehicle can develop on given surface and at a given speed is calculated as:

$$\Omega_{max} = [\mu * a_{ymax} + (\mu+1)*(c_{lim1} + c_{lim2}V_x)]/V_x \qquad (5)$$

where $a_{ymax}$ is the maximum acceleration that vehicle can sustain on dry surface, $c_{lim1}$ and $c_{lim2}$ are tunable constants, for example $c_{lim1}=0.1$ and $c_{lim2}=0.5$. Thus, the estimated yaw rate $\Omega_{ws2}$ is limited to form $\Omega_{ws3}$ as follows:

$$\Omega_{ws3} = \begin{cases} \Omega_{ws2} & \text{if } |\Omega_{ws2}| \le \Omega_{max} \\ \Omega_{max} * \text{sign}(\Delta\Omega_{ws2}) & \text{if } |\Omega_{ws2}| > \Omega_{max} \end{cases} \qquad (6)$$

Since the first yaw rate estimate $\Omega_{ws3}$ is based on rear wheel speeds, it tends to lag the actual yaw rate, at least for some vehicles, possibly introducing a significant error during quick transients. On the other hand, the steering angle δ leads the actual yaw rate. Accordingly, the lag in $\Omega_{ws3}$ can be reduced during quick transients by calculating a weighted average of $\Omega_{ws3}$ and the desired steady state yaw rate $\Omega_{dss}$, which is based on the steering angle δ. The desired yaw rate at steady state $\Omega_{dss}$ is determined as:

$$\Omega_{dss} = \delta * V_x/(a + b + K_{us}*V_x^2) \qquad (7)$$

where a and b are the distances in longitudinal direction between the center of gravity C and the front and rear axles, respectively, and $K_{us}$ is an understeer coefficient given by $$K_{us} = (c_r*b - c_f*a)*M/[c_f*c_r*(a+b)] \qquad (8)$$

where $c_f$ and $c_r$ are the cornering stiffness coefficients of both tires of the front axle and both tires of the rear axle, respectively.

If the vehicle is experiencing a quick transient, as determined at block 226, the blocks 228–232 are executed to calculate $\Omega_{dss}$ using expression (7), to limit $\Omega_{dss}$ to $\Omega_{max}$, and to calculate the weighted average of $\Omega_{dss}$ and $\Omega_{ws3}$. The existence of quick transient operation is detected if the derivatives of the measured lateral acceleration ($a_{yder} = da_{ym}/dt$) and the desired lateral acceleration ($a_{ydder} = da_{yd}/dt$) are both large in magnitude and have the same sign. The derivatives may be computed by passing the lateral acceleration (measured or desired) through a low pass filter to attenuate noise, and passing the filter output through a high pass filter. If a quick transient condition is detected according to these rules, the estimate of yaw rate from wheel speeds $\Omega_{ws3}$ is essentially shifted forward in time since $\Omega_{ws3}$ lags the actual yaw rate, and the desired yaw rate $\Omega_{dss}$ leads the actual yaw rate. The weighting of the components depends on the estimate of the surface coefficient of adhesion $\mu$, the weighted average $\Omega_{wsf}$ being determined by the expression:

$$\Omega_{wsf} = (1 - w_\mu * \mu) * \Omega_{ws3} + w_\mu * \mu * \Omega_{dss} \qquad (9)$$

where $w_\mu$ is a weighting constant, for example $w_\mu = 0.5$. If the vehicle is not in a quick transient, the final estimate from wheel speeds $\Omega_{wsf}$ is set equal to $\Omega_{ws3}$. The weighting is dependent upon surface coefficient $\mu$ because on slippery surfaces, the lag of the yaw estimate based on wheel speeds tends to produce a smaller yaw rate error than on dry surfaces.

Figure 6:
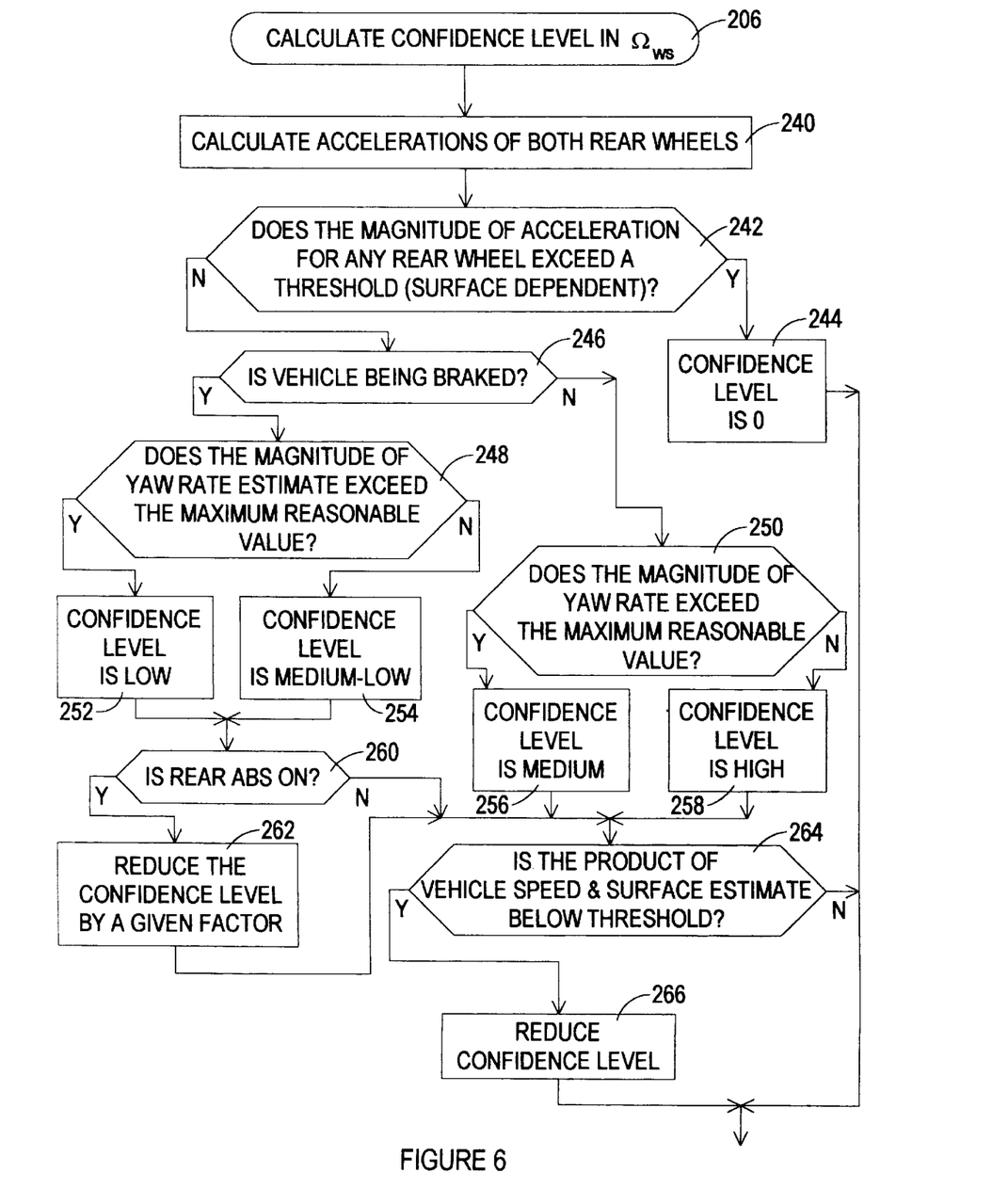
FIG. 6 is a flow diagram for evaluating the confidence level in the estimate of yaw rate from wheel speeds.

The determination of the level of confidence in the estimate of $\Omega_{wsf}$ (block 206 of FIG. 4) is illustrated in FIG. 6. Essentially, the confidence level depends on whether the wheels are being braked, whether anti-lock brake control is activated, whether the acceleration of any of the wheels exceeds certain threshold values, and whether the magnitude of the raw estimated yaw rate $\Omega_{ws1}$ (i.e., before limiting) exceeds an estimate of the maximum yaw rate that the vehicle can sustain on given surface and at a given speed. Fundamentally, the estimation of $\Omega_{wsf}$ relies on the assumption that the rotations of the wheels are kinematically coupled with the motion of the vehicle body—that is, that the linear speeds of the centers of the wheels are equal to the rotational speeds of the wheels times the rolling radii of corresponding tires. In other words, it is assumed that wheel slippage is negligible. Therefore, detection of any operating conditions that could cause significant slip of the rear wheels (such as braking) should result in reduction of the confidence level in $\Omega_{wsf}$. The term braking refers here to driver braking, since it is assumed that the active brake control occurs only on the front wheels. Information on vehicle braking is derived from a brake switch or brake pedal travel sensor 82 when available. If it is not available, or when diagnostics indicate that the sensor 82 has failed, braking can be detected by comparing the vehicle deceleration (estimated from vehicle speed) to a threshold value and by comparing magnitudes of accelerations of both un-driven wheels to threshold values. If any of them exceeds the threshold values, braking is assumed.

Referring to FIG. 6, block 240 is first executed to calculate the accelerations $a_{wlr}$ and $a_{wrr}$ of the left rear and right rear wheels. This is achieved, for example, by first passing the wheel speeds through a low pass filter to attenuate noise and then passing the filtered signals through a high pass filter. Similarly, vehicle longitudinal acceleration a, is calculated, for example by passing vehicle speed through a similar set of filters but with lower cut off frequencies. If either of the magnitudes of calculated wheel acceleration values $a_{wlr}$, $a_{wrr}$ exceeds a threshold dependent on the estimated surface coefficient $\mu$, as determined at block 242, block 244 is executed to set the confidence level to zero. If the wheel acceleration values are below the threshold, block 246 is executed to determine if the rear wheels are being braked. As indicated above, this may be determined from sensor 82, or by comparing the vehicle deceleration to a threshold value and by comparing magnitudes of accelerations of both un-driven wheels to threshold values. Additionally, braking may be assumed if anti-lock braking is active for either rear wheel. The acceleration thresholds are set to ignore very light braking, as such braking usually does not cause significant deterioration of $\Omega_{wsf}$.

The confidence level is also generally reduced when the magnitude of $\Omega_{ws2}$ (i.e., the estimate obtained before its magnitude was limited) exceeds a threshold value $\Omega_{max}$ that is considered the maximum possible value at a particular speed and on a particular surface. Thus, $\Omega_{ws2}$ is compared to the maximum values at blocks 248 and 250. In the illustrated embodiment, the maximum value differs depending on whether the vehicle is being braked. When vehicle is not being braked (i.e., block 246 answered in the negative), $\Omega_{max}$ is the same as given above in expression (5). During braking, (i.e., block 246 answered in the affirmative), $\Omega_{max}$ is calculated from the same type of expression but with slightly different calibrations, as follows:

$$\Omega_{max}=[\mu^*a_{ymax}+(\mu+1)^*(c_{lim3}+c_{lim4}{}^*V_x)]/V_x \qquad (10)$$

where the constants $c_{lim3}$ and $c_{lim4}$ are, for example, $c_{lim3}=0.1$ and $c_{lim4}=0.4$. In either case, $\Omega_{ws2}$ is filtered to attenuate noise before being compared to the respective value of $\Omega_{max}$.

Based on the above-described considerations, the confidence level $Con_{ws}$ for wheel speed based yaw rate estimate $\Omega_{wsf}$ is selected from among several pre-defined numerical values designated as low, medium-low, medium and high. If the vehicle is being braked, and block 248 is answered in the affirmative, block 252 sets the confidence level to low. If the vehicle is being braked, and block 248 is answered in the negative, block 254 sets the confidence level to medium-low. If the vehicle is not being braked, but block 250 is answered in the affirmative, block 256 sets the confidence level to medium. If the vehicle is not being braked, and block 250 is answered in the negative, block 258 sets the confidence level to high. If the vehicle is being braked, block 260 is additionally executed to determine if anti-lock control is active for either of the rear (un-driven) wheels. If so, the confidence level determined at block 252 or 254 is reduced by a fractional factor $c_{mult}$ such as 0.5, as indicated at block 262. Example values of the confidence level in the estimate from wheel speeds are: 1.5 for high, 0.8 for medium, 0.4 for medium-low, and 0.1 for low.

In addition to the above-described considerations, the confidence level $Con_{ws}$ is reduced at block 264 when the vehicle travels on slippery surfaces at low speeds. This is achieved by comparing the product of vehicle speed $V_x$ and $\mu$ to a threshold. If the product is below the threshold, the determined confidence level is multiplied by a fractional factor based on the product to reduce the confidence level, as indicated at block 266. That is, if $V_x{}^*\mu<$Threshold, $$Con_{ws}=Con_{ws}{}^*(c_{in}+c_{sl}{}^*V_x{}^*\mu) \qquad (11)$$

where the constants $c_{in}$ and $c_{sl}$ are the intercept and the slope of the linear interpolation function; the example values are $c_{in}=-0.2$ and $c_{sl}=1.2$ and Threshold=1 m/s.

The estimate of yaw rate from lateral acceleration (FIG. 4, block 204) is computed from the following kinematic relationship:

$$\Omega_{ay}=a_{yf}/V_x \qquad (12)$$

However, this relationship is only valid in maneuvers involving constant or slowly varying steering angle and vehicle speed, since the full relationship between the yaw rate and lateral acceleration includes a lateral velocity derivative term, as follows:

$$\Omega=(a_{yf}-dV_y/dt)/V_x \qquad (13)$$

Therefore the confidence level in $\Omega_{ay}$ is high when vehicle is approximately in steady state conditions and is low when vehicle is in a quick transient maneuver. The evaluation of how close a given vehicle state is to steady state can be determined by calculating magnitudes of the derivatives of the desired and measured lateral acceleration. Alternatively, desired yaw rate, or any properly selected function of steering angle and vehicle velocity, could be used instead of desired lateral acceleration. According to the illustrated embodiment, the vehicle is considered to be in the steady state when the magnitudes of the derivatives of lateral acceleration and desired lateral acceleration are both below threshold values and when the measured and desired lateral accelerations have the same signs.

Figure 8:
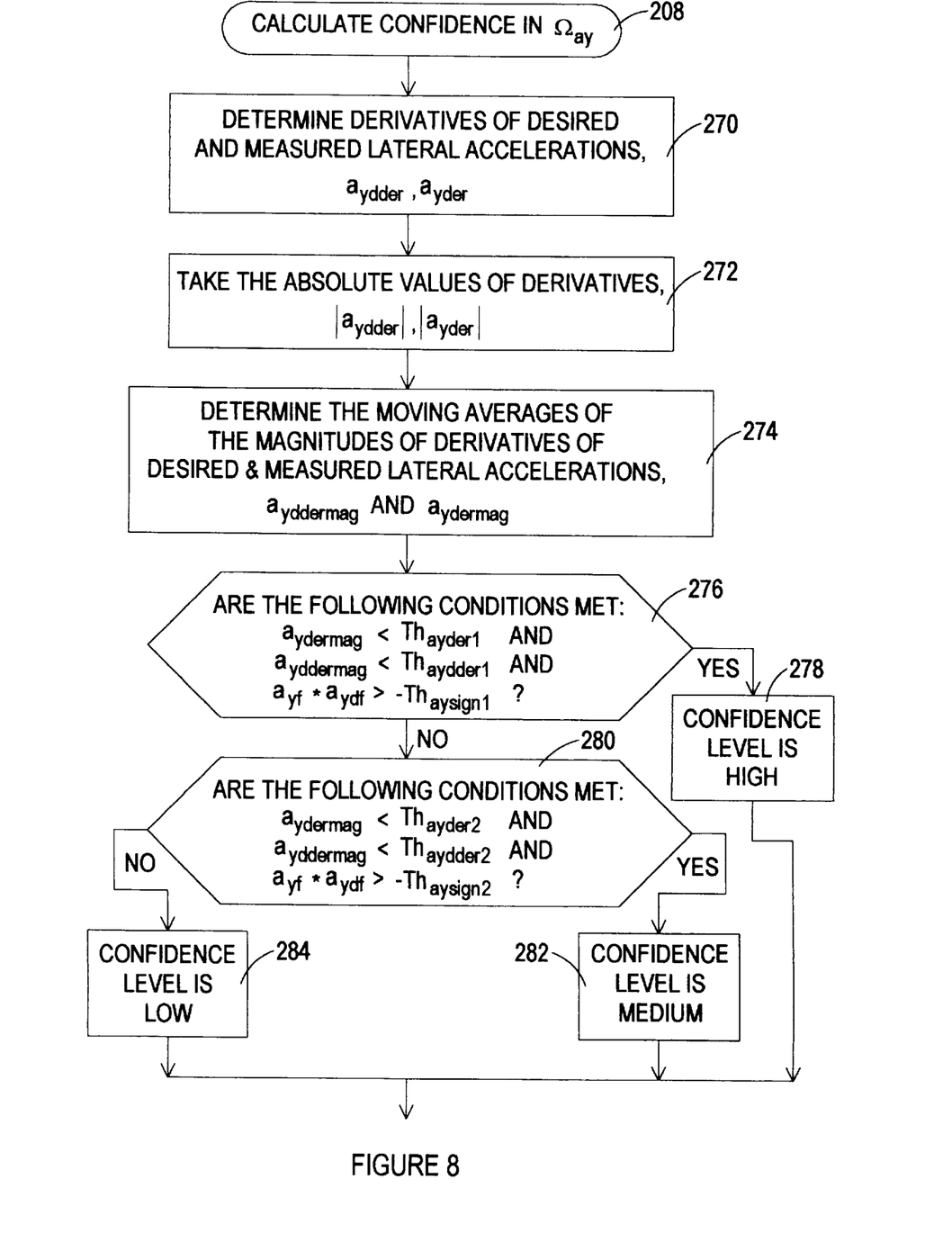
FIG. 8 is a flow diagram for evaluating the confidence level in the estimate of yaw rate from lateral acceleration.

Determination of the confidence level in $\Omega_{ay}$ (FIG. 4, block 208) is detailed in the flow diagram of FIG. 8. First, blocks 270–274 are executed to determine moving averages of the magnitudes of the derivatives of the measured and desired lateral accelerations. In each case, the derivative is first determined by passing the respective acceleration signal through a high pass filter, taking the absolute value of the filter output, and passing it through a low pass filter to obtain a moving average of the derivative magnitude. The low pass filter is used to prevent the derivative magnitude from becoming very small when the derivative briefly passes through zero.

Based on the above-described considerations, the confidence level $Con_{ay}$ for $\Omega_{ay}$ is selected from among several pre-defined numerical values designated as low, medium and high. As indicated at blocks 276–278, the confidence level is set to high if (1) the magnitude of the derivative of lateral acceleration is below a threshold (that is, $a_{ydermag}<Th_{ayder1}$); and (2) the magnitude of the derivative of desired lateral acceleration is below a 15 threshold (that is, $a_{yddermag}<Th_{aydder1}$); and (3) the desired and measured lateral accelerations have either the same signs or at least one of them is small (that is, $a_{yf}{}^*a_{ydf}>-Th_{aysign1}$). Example values of the above thresholds are: $Th_{ayder1}=5.5$ m/s$^3$, $Th_{aydder1}=6.5$ m/s$^3$, $Th_{aysign1}=0.3$ m$^2$/s$^4$. If these conditions are not satisfied, block 280 compares the derivatives to higher thresholds to determine whether the confidence level should considered to be low or medium. As indicated at blocks 280–282 confidence level is medium if (1) the magnitude of the derivative of lateral acceleration is below a threshold (that is, $a_{ydermag}<Th_{ayder2}$); and (2) the magnitude of the derivative of desired lateral acceleration is below a threshold (that is, $a_{yddermag}<Th_{aydder2}$); and (3) the desired and measured lateral accelerations have either the same signs or at least one of them is small (that is, $a_{yf}{}^*a_{ydf}>-Th_{aysign2}$). Example values of these thresholds are: $Th_{ayder2}=9.0$ m/s$^3$, $Th_{aydder2}=15.0$ m/s3, $Tk_{aysign2}=0.8$ m$^2$/s$^4$. If neither of the above two sets of conditions is satisfied, then the confidence 30 level is set to low at block 284. Example values of the confidence level in the estimate from lateral acceleration are: 0.8 for high, 0.5 for medium, and 0.1 for low.

As indicated at block 210 of FIG. 4, the preliminary estimate $\Omega_{ep}$ of yaw rate is computed as a weighted average of $\Omega_{ay}$ and $\Omega_{wsf}$, with the weights proportional to the determined confidence levels $Con_{ay}$ and $Con_{ws}$ Specifically, $\Omega_{ep}$ is given by:

$$\Omega_{ep}=(Con_{ay}{}^*\Omega_{ay}+Con_{ws}{}^*\Omega_{wsf})/(Con_{ay}+Con_{ws}) \qquad (14)$$

Additionally, the total confidence level $Con_{tot}$ in the preliminary estimate $\Omega_{ep}$ is computed as a sum of the $Con_{ay}$ and $Con_{ws}$, or $Con_{tot}=Con_{ay}+Con_{ws}$. It is noted that the confidence levels should be selected such that their total is always greater than zero.

The non-linear observer referred to at block 212 of FIG. 4 calculates the final estimate of yaw rate and an estimate of lateral velocity. The slip angle β is determined at block 214 as an inverse tangent function of the ratio of the estimated lateral velocity to the longitudinal velocity. The observer is a simple nonlinear model of vehicle dynamics in yaw plane that depends on the estimated surface coefficient of adhesion and vehicle speed, and uses the measured lateral acceleration $a_{ym}$, steering angle δ, and the preliminary estimate of yaw rate $\Omega_{ep}$ as feedback signals. The feedback terms provide correction when the estimates deviate from actual values, preventing the tendency of the estimates to diverge with time because of inaccuracies between the model and the actual system and because of external disturbances. The observer depends on the estimated surface coefficient of adhesion because the dynamic response of the vehicle at or close to the limit of adhesion is strongly affected by the surface coefficient of adhesion.

Figure 7:
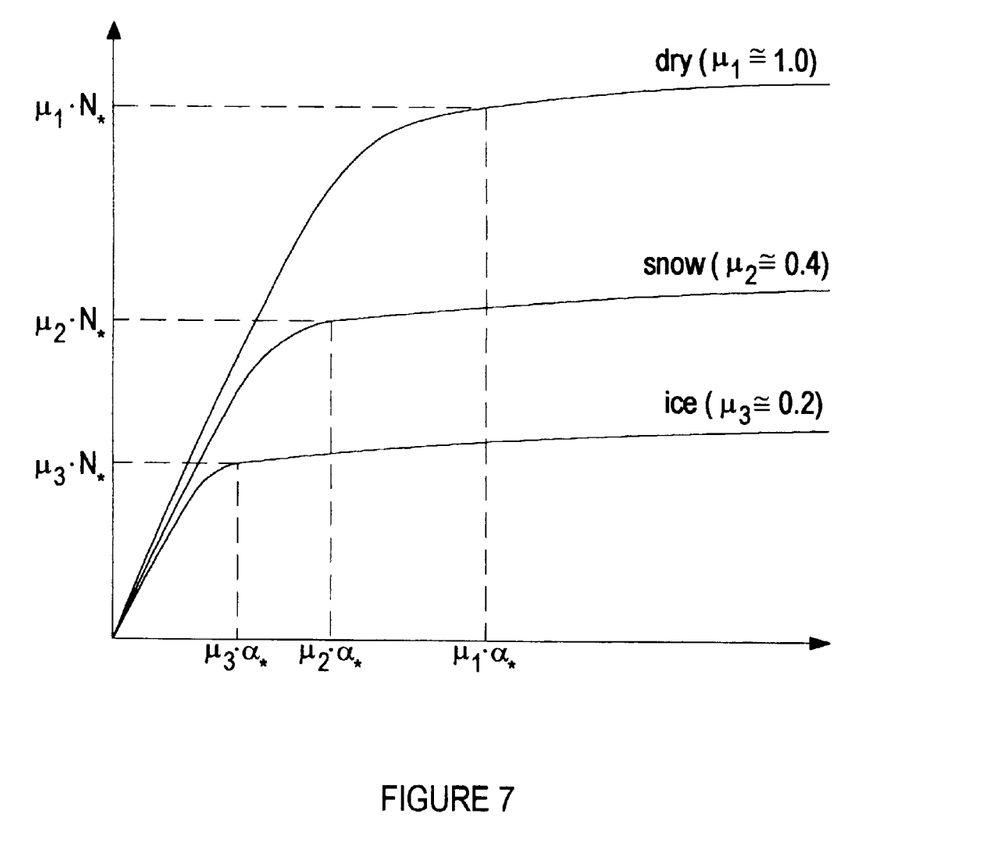
FIG. 7 is a graph for modeling lateral forces as function of slip angle and surface coefficient of adhesion.

Assuming a small steering angle δ, the dynamics of a bicycle vehicle model in a horizontal plane can be described by the following equations:

$$dV_y/dt=-V_x*\Omega+(F_{yf}+F_{yr})/M \quad (15)$$

$$d\Omega/dt=(a*F_{yf}-b*F_{yr})/I_{zz} \quad (16)$$

where M is the vehicle mass, $I_{zz}$ is the moment of inertia about the yaw axis through the center of gravity C, a and b are distances from the center of gravity C to the front and rear axles of the vehicle, $V_y$ is the lateral velocity and $F_{yf}$ and $F_{yr}$ are the lateral forces of the front and rear axles, respectively. These equations express the second law of dynamics for translation along lateral axis and rotation about the yaw axis. A critical step in the modeling process is computation of lateral forces of front and rear axles. These forces are relational to the slip angles of tires: the lateral forces initially rise almost linearly with the slip angle, then curve and saturate when the limit of adhesion is reached, as graphically depicted in FIG. 7. The value of lateral forces at the limit is approximately proportional to the coefficient of adhesion. Also the value of slip angle at saturation is smaller on low coefficient of adhesion surfaces than on high coefficient of adhesion surfaces, as denoted by the Independent traces in FIG. 7. In order to capture these fundamental properties of lateral forces, they are modeled at each axle as a function of slip angle and the estimated coefficient of adhesion by combination of a parabolic segment with a straight line at the top.

It can be shown that the following equations also hold true for the bicycle model of the vehicle:

$$dV_y/dt=a_y-V_x*\Omega \quad (17)$$

$$a_y=(F_{yf}+F_{yr})/M \quad (18)$$

The following observer is supported by the above equations:

$$dV_{ye}/dt=-V_x*\Omega_e+(F_{yfe}+F_{yre})/M+g_{11}*(a_{ym}-dV_{ye}/dt-V_x*\Omega_e) \\ +g_{12}*(\Omega_{ep}-\Omega_e)-g_{13}*(a_{ym}-(F_{yfe}+F_{yre})/M) \quad (19)$$

$$d\Omega_e/dt=(a*F_{yfe}-b*F_{yre})/I_{zz}+g_{21}*(a_{ym}-(F_{yfe}+F_{yre})/M) +g_{22}*(\Omega_{ep}-\Omega_e) \quad (20)$$

where $a_{ym}$ is the unfiltered measured lateral acceleration, $F_{yfe}$ and $F_{yre}$ are estimates of the lateral forces $F_{yf}$ and $F_{yr}$ computed as described below, $V_{ye}$ is the estimate of lateral velocity, $\Omega_e$ is the final estimate of yaw rate and $g_{11}$, $g_{12}$, $g_{13}$, $g_{21}$, and $g_{22}$ are the observer gains. The yaw moment applied to the vehicle by active braking has only a small effect on the estimates of yaw rate and lateral velocity, and is neglected. If the estimates are perfect, then all expressions multiplied by the gains vanish; however, when a discrepancy between the estimated and measured values arise, the terms multiplied by the gains provide feedback to the vehicle model, reducing the errors between the measured and estimated values.

In the above observer equations, the terms which do not involve the gains comprise an open loop dynamic model of the vehicle responsive to the measured vehicle speed, the measured steering angle and the estimated surface coefficient of adhesion (through the lateral forces, $F_{yfe}$ and $F_{yre}$), and the remaining terms of the observer comprise a closed loop component in which:

$g_{11}$ is multiplied by a first error between the measured lateral acceleration and lateral acceleration predicted from estimated lateral velocity and estimated yaw rate, $g_{12}$ and $g_{22}$ are multiplied by a second error between a preliminary estimate of yaw rate and the final estimate of yaw rate, and $g_{13}$ and $g_{21}$ are multiplied by a third error between the measured lateral acceleration and a lateral acceleration predicted from the estimates of lateral forces.

The above description does not take into account the effect of the bank angle of the road, which affects vehicle dynamics and the measured lateral acceleration. Assuming a bank angle γ, a component of gravity force, $M*g*\sin \gamma$, is added to the balance of forces in the lateral direction, yielding:

$$dV_y/dt=-V_x*\Omega+(F_{yf}+F_{yr})/M+g*\sin \gamma \quad (21)$$

The actual lateral acceleration ay and measured lateral acceleration $a_{ym}$ are related by the expression:

$$a_{ym}=a_y-g*\sin \gamma \quad (22)$$

Since $a_y$ is not measured and $a_{ym}$ is, the feedback can be derived from:

$$a_{ym}=(F_{yf}+F_{yr})/M \quad (23)$$

which accounts for both level and banked road surfaces.

To reduce the tendency of the observer to develop steady-state error in response to a constant bank angle, the lateral acceleration error is low-pass filtered and the filter output is used as feedback in the observer. Thus, the observer becomes:

$$dV_{ye}/dt=-V_x*\Omega_e+(F_{yfe}+F_{yre})/M+g_{11}*(a_{ym}-dV_{ye}/dt-V_x*\Omega_e) \\ +g_{12}*(\Omega_{ep}-\Omega_e)-g_{13}*\Delta A_y-g_{14}*\Delta A_{yf} \quad (24)$$

$$d\Omega_e/dt=(a*F_{yfe}-b*Fyre)/I_{zz}+g_{21}*\Delta A_y+g_{22}*(\Omega_{ep}-\Omega_e) \quad (25)$$

where $\Delta A_y$ is $[a_{ym}-(F_{yfe}+F_{yre})/M]$ and $\Delta A_{yf}$ is $\Delta A_y$ passed through a low-pass filter. Thus now a fourth component of the closed loop error term is included as the low pass filtered result of the third error term to provide bank angle compensation. The gains $g_{11}$, $g_{12}$, $g_{13}$, $g_{14}$, $g_{21}$, and $g_{22}$ are tuning parameters preset by a system designer, typically through routine experimentation on a test vehicle, and may vary from implementation to implementation. The gains $g_{12}$ and $g_{22}$, which are associated with the terms involving the preliminary estimate of yaw rate $\Omega_{ep}$, are calculated as functions of the total confidence level in that estimate, $Con_{tot}$, as described below.

Figure 9:
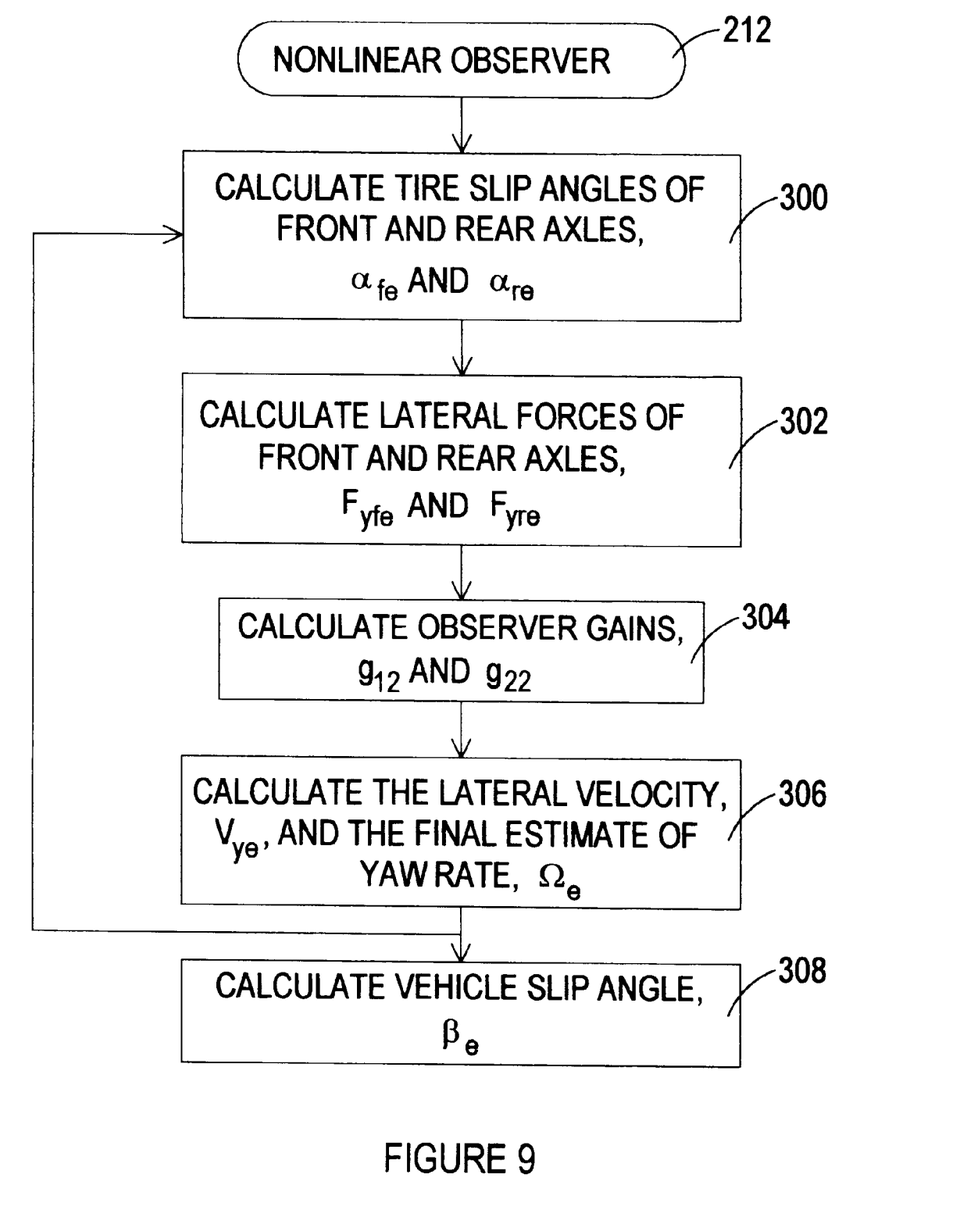
FIG. 9 is a flow diagram for calculation of the final estimate of yaw rate and the estimate of slip angle using a dynamic observer.

FIG. 9 is a flow diagram of an implementation of the non-linear observer described above. At block 300, the side slip angles of front and rear axles are estimated using the following equations:

$$\alpha_{fe}=[V_{ye}(k-1)+a*\Omega_e(k-1)]/V_x-\delta \quad (26)$$

$$\alpha_{re}=[V_{ye}(k-1)-b*\Omega_e(k-1)]/V_x \quad (27)$$

where $V_{ye}(k-1)$ and $\Omega_e(k-1)$ are the estimated lateral velocity and the estimated yaw rate from the previous iteration of the observer, and $\alpha_{fe}$ and $\alpha_{re}$ are the estimated front and rear axle side slip angles.

At block 302, the lateral force of the front and rear axles $F_{yfe}$ and $F_{yre}$ are estimated. The lateral force of the front axle $F_{yfe}$ is estimated as:

$$F_{yfe} = \begin{cases} -c_f * \alpha_{fe} * (1 - b_{cf} * |\alpha_{fe}|/\mu) & \text{if } |\alpha_{fe}| < \mu * \alpha_{f^*} \\ -N_{f^*} * (|\alpha_{fe}|/\alpha_{fe}) * [\mu + s_r * (|\alpha_{fe}|/\alpha_{f^*} - \mu)], & \text{if } |\alpha_{fe}| \geq \mu * \alpha_{f^*} \end{cases} \quad (28)$$

where $s_f$ is the slope of the $F_{yf}$ vs. $\alpha_f$ curve of FIG. 7 at the limit of adhesion. An example value of $s_f$ is 0.03. The term $\alpha_{f^*}$ is defined as:

$$\alpha_{f^*} = 1/(2*b_{cf}) \quad (29)$$

where $b_{cf} = c_f/(4*N_{f^*})$, and $N_{f^*} = M*b*(a_{ymax}+\Delta_a)/(a+b)$. The term $a_{ymax}$ is the maximum lateral acceleration that the vehicle can sustain on a dry surface in m/s$^2$ and $\Delta_a$ is a constant, e.g., $\Delta_a$=0.7 m/s$^2$. Physically, $N_{f^*}$ represents the maximum lateral force at the front axle during hard cornering on dry surface.

The lateral forces of the rear axle $F_{yre}$ are estimated as:

$$F_{yre} = \begin{cases} -c_r * \alpha_{re} * (1 - b_{cr} * |\alpha_{re}|/\mu) & \text{if } |\alpha_{re}| < \mu * \alpha_{r^*} \\ -N_{r^*} * (|\alpha_{re}|/\alpha_{re}) * [\mu + s_r * (|\alpha_{re}|/\alpha_{r^*} - \mu)], & \text{if } |\alpha_{re}| \geq \mu * \alpha_{r^*} \end{cases} \quad (30)$$

where $s_r$ is a small non-negative number, e.g., $s_r$=0.03 and where $\alpha_{r^*}$ is defined by:

$$\alpha_{r^*} = 1/(2*b_{cr}) \quad (31)$$

where $b_{cr} = c_r/(4*N_{r^*})$, and $N_{r^*} = M*a*(a_{ymax}+\Delta_a)/(a+b)$.

The observer gains, $g_{12}$ and $g_{22}$ are determined at block 304 as functions of the total confidence level $Con_{tot}$ as follows:

$$g_{12} = c_{mult1}*(c_{off1}+Con_{tot}) \quad g_{22} = c_{mult2}*(c_{off2}+Con_{tot}) \quad (32)$$

where $c_{mult1}$, $c_{off1}$, $c_{mult2}$, and $c_{off2}$ are positive constants; for example $c_{mult1}$=1.0, $c_{off1}$=0.5, $c_{mult2}$=3.0, and $c_{off2}$=0.5. Thus the gains $g_{12}$ and $g_{22}$ increase as the confidence level in the estimates increases. Example values of the remaining observer gains are: $g_{11}$=0.0, $g_{13}$=0.4, $g_{14}$=0.2, $g_{21}$=0.4.

The system state variables for yaw and lateral velocity $\Omega_e(k)$ and $V_{ye}(k)$ are then estimated at block 306 as follows:

$$V_{ye}(k) = V_{ye}(k-1) + \Delta_t * \{[-(1+g_{11})*V_x - g_{12}]*\Omega_e(k-1) + (1+g_{13})*(F_{yfe} + F_{yre})/M + (g_{11}-g_{13})*a_{ym} + g_{12}*\Omega_{ep}(k-1) - g_{14}*\Delta A_{yf}\}/(1+g_{11}) \quad (33)$$

$$\Omega_e(k) = (1-g_{22}*\Delta_t)*\Omega_e(k-1) + \Delta t * \{(a*F_{yfe} - b*F_{yre})/I_{zz} + g_{21}*\Delta A_y + g_{22}*\Omega_{ep}(k)\} \quad (34)$$

where $\Delta A_y = a_{ym} - (F_{yfe}+F_{yre})/M$, and $\Delta A_{yf}$ is $\Delta A_y$ passed through a first order digital low pass filter, for example, with a cut off frequency of 1 rad/s. As indicated above at block 214 of FIG. 4, the slip angle $\beta$ is then estimated as:

$$\alpha = \text{Arctan } (V_{ye}(k)/V_x) \quad (35)$$

In summary, this invention provides an active brake control that does not require a yaw sensor, but that can reliably estimate and control yaw rate and slip angle even during conditions that degrade the validity of an estimated or computed yaw value based on an assumption of zero wheel slip. While described in reference to the illustrated embodiment, it is expected that various modifications will occur to those skilled in the art, and that controls incorporating such modifications may fall within the scope of this invention, which is defined by the appended claims.

What is claimed is:

1. A method of estimating vehicle yaw rate in a vehicle stability enhancement control configured to produce a corrective vehicle yaw moment based on a deviation of the vehicle yaw rate from a desired value, where the vehicle has a pair of undriven wheels, the method comprising the steps of:

measuring speeds of the undriven wheels of the vehicle;
   measuring a lateral acceleration of the vehicle;
   measuring a vehicle steering angle;
   determining a preliminary estimate of yaw rate of the vehicle based on the measured speeds and the measured lateral acceleration;
   estimating a final yaw rate and lateral velocity with a closed-loop non-linear dynamic observer, wherein the measured lateral acceleration and the preliminary estimate of yaw rate are provided as closed-loop feedback inputs to the dynamic observer; wherein the step of determining a preliminary estimate of yaw rate of the vehicle comprises the steps of:
   estimating a first yaw rate of the vehicle based on the measured wheel speeds;
   determining a first confidence level indicative of an accuracy of said first yaw rate estimate;
   estimating a second yaw rate of the vehicle based on the measured lateral acceleration;
   determining a second confidence level indicative of an accuracy of said second yaw rate estimate;
   computing the preliminary yaw rate estimate based on a weighted average of said first and second yaw rate estimates, the first and second confidence levels determining the weights given to the first and second yaw rate estimates.

2. The method of claim 1, including the step of:
   compensating said first yaw rate estimate for differences in tire loading during cornering of the vehicle.

3. The method of claim 2, wherein the step of compensating said first yaw rate includes the steps of:
   determining a compensation factor as a function of vehicle speed and said measured lateral acceleration; and
   subtracting said compensation factor from said first yaw rate.

4. The method of claim 1, wherein the step of estimating said first yaw rate includes the steps of:
   estimating a lateral surface coefficient of adhesion of the vehicle;
   determining a maximum rate of change of yaw rate as function of said estimate of lateral surface coefficient of adhesion; and
   limiting the rate of change of said first estimate of yaw rate to less than the determined maximum rate of change of yaw rate.

5. The method of claim 1, wherein the step of estimating said first yaw rate includes the steps of:
   estimating a lateral surface coefficient of adhesion of the vehicle;
   determining a maximum yaw rate as function of said estimate of lateral surface coefficient of adhesion and vehicle speed; and limiting said first estimate of yaw rate to less than the determined maximum yaw rate.

6. The method of claim 1, wherein the step of estimating said first yaw rate includes the steps of:

measuring a driver steering angle of said vehicle;

determining a desired steady state yaw rate based on said measured steering angle and an estimate of vehicle speed;

re-estimating said first estimate of yaw rate based a weighted average of said first estimate of yaw rate and said desired steady state yaw rate when a transient operating condition of the vehicle is detected.

7. The method of claim 6, including the step of:

estimating a lateral surface coefficient of adhesion of the vehicle, the estimate of lateral adhesion determining the weights given to the first estimate of yaw rate and the desired yaw rate.

8. The method of claim 1, wherein the step of determining said first confidence level includes the step of:

detecting an operating condition of the vehicle indicative of potential slippage of at least one of the un-driven wheels, and setting the first confidence level to a value indicative of low confidence in response to such detection, thereby reducing the weight of said first estimate of yaw rate in the computation of said preliminary estimate of yaw rate.

9. The method of claim 8, wherein the detecting of an operating condition of the vehicle indicative of potential slippage of at least one of the un-driven wheels includes detecting a condition of significant driver braking of the vehicle.

10. The method of claim 9, wherein the step of detecting a condition of significant driver braking includes the steps of:

estimating a lateral surface coefficient of adhesion of the vehicle;

determining acceleration magnitudes of the un-driven wheels;

calculating vehicle deceleration;

detecting a condition of significant driver braking when any of said acceleration magnitudes exceeds a threshold based on the estimated lateral surface coefficient of adhesion, or said vehicle deceleration exceeds a threshold based on the estimated lateral surface coefficient of adhesion.

11. The method of claim 8, wherein the detecting of an operating condition of the vehicle indicative of potential slippage of at least one of the un-driven wheels includes:

estimating a lateral surface coefficient of adhesion of the vehicle;

determining a maximum yaw rate as function of said estimate of lateral surface coefficient of adhesion and vehicle speed; and detecting an operating condition of the vehicle indicative of potential slippage of at least one of the un-driven wheels when the first estimate of yaw rate exceeds the determined maximum yaw rate.

12. The method of claim 8, wherein the step of detecting an operating condition of the vehicle indicative of potential slippage of at least one of the un-driven wheels includes the steps of:

estimating a lateral surface coefficient of adhesion of the vehicle;

determining a maximum magnitude of wheel acceleration as function of said estimate of lateral surface coefficient of adhesion; and detecting an operating condition of the vehicle indicative of potential slippage of at least one of the un-driven wheels when an acceleration magnitude of at least one of said un-driven wheels exceeds the determined maximum magnitude of wheel acceleration.

13. The method of claim 8, wherein the detecting of an operating condition of the vehicle indicative of potential slippage of at least one of the un-driven wheels includes:

estimating a lateral surface coefficient of adhesion of the vehicle; and detecting an operating condition of the vehicle indicative of potential slippage of at least one of the un-driven wheels when the product of the estimated lateral surface coefficient and vehicle speed is below a threshold.

14. The method of claim 1, wherein the step of determining said second confidence level includes the step of:

detecting an operating condition indicative of a transient maneuver of the vehicle, and setting the second confidence level to a value indicative of low confidence in response to such detection, thereby reducing the weight of said second estimate of yaw rate in the computation of said preliminary estimate of yaw rate.

15. The method of claim 14, wherein the step of detecting an operating condition indicative of a transient maneuver of the vehicle includes the steps of:

determining a desired lateral acceleration;

determining rates of change of said measured lateral acceleration and said desired lateral acceleration; and detecting an operating condition indicative of a transient maneuver of the vehicle when said determined rates of change exceed predefined thresholds.

16. A method of estimating vehicle yaw rate in a vehicle stability enhancement control configured to produce a corrective vehicle yaw moment based on a deviation of the vehicle yaw rate from a desired value, where the vehicle has a pair of undriven wheels, the method comprising the steps of:

measuring speeds of the undriven wheels of the vehicle;

measuring a lateral acceleration of the vehicle;

measuring a vehicle steering angle;

determining a preliminary estimate of yaw rate of the vehicle based on the measured speeds and the measured lateral acceleration; and estimating a final yaw rate and lateral velocity with a closed-loop non-linear dynamic observer, wherein the measured lateral acceleration and the preliminary estimate of yaw rate are provided as closed-loop feedback inputs to the dynamic observer;

wherein the closed-loop non-linear dynamic observer includes gain terms applied to a difference between said preliminary estimate of yaw rate and said final estimate of yaw rate, and the method includes the steps of:

determining an overall confidence level according to the sum of said first and second confidence levels; and adjusting said gain terms in proportion to the determined overall confidence.

\* \* \* \* \*